United States Patent [19]

Cardew et al.

[11] Patent Number: 5,112,892

[45] Date of Patent: * May 12, 1992

[54] METHOD FOR THE PRODUCTION OF AN ASYMMETRIC SEMIPERMEABLE MEMBRANE FROM A SOLUTION OF A SULFONATED POLYARYLETHERSULFONE

[75] Inventors: Peter T. Cardew, Manchester; David R. Holmes, Cheshire; John W. Smith, Liverpool, all of England

[73] Assignee: Imperial Chemical Industries plc, Great Britain

[*] Notice: The portion of the term of this patent subsequent to Dec. 22, 2004 has been disclaimed.

[21] Appl. No.: 578,294

[22] Filed: Sep. 6, 1990

Related U.S. Application Data

[60] Division of Ser. No. 53,579, May 22, 1987, abandoned, which is a continuation of Ser. No. 865,832, May 22, 1986, abandoned.

[30] Foreign Application Priority Data

May 23, 1985 [GB] United Kingdom ............... 8513113

[51] Int. Cl.$^5$ .................... C08J 3/08; C08L 81/06; C08L 71/04; C08K 5/15
[52] U.S. Cl. .................... 524/108; 524/205; 524/465; 524/475; 524/592; 521/27; 521/64; 528/171; 528/381; 528/382; 528/388
[58] Field of Search ............... 524/108, 205, 210, 364, 524/464, 465, 475, 592, 609; 521/27, 64

[56] References Cited

U.S. PATENT DOCUMENTS

| | | | |
|---|---|---|---|
| 3,855,122 | 12/1974 | Bourganel | 521/27 |
| 3,875,096 | 1/1975 | Graefe | 524/108 |
| 4,008,203 | 2/1977 | Jones | 524/259 |
| 4,268,650 | 5/1981 | Rose | 525/534 |
| 4,419,486 | 12/1983 | Rose | 525/534 |
| 4,714,725 | 12/1987 | Hendy et al. | 521/64 |
| 4,920,193 | 8/1990 | Hann et al. | 528/381 |

OTHER PUBLICATIONS

Hendy et al, Ser. No. 035,235, *Membranes*.
D. R. Lloyd et al; ACS Symposium Series 153, Synthetic Membranes, vol. 1, Ed A. F. Turbak, 1981, 327–350; Poly(Aryl Ether) Membranes for Reverse Osmosis.
D. R. Lloyd et al; Desalination, 1983, 46, 327–334 Asymmetric membrane Preparation from non-solvent Casting Systems.
D. R. Lloyd et al; A report prepared for ICI; May 1, 1984; Phase Inversion Preparation of Sulphonated Poly(Ether Sulphone) Asymmetric Membranes.
D. R. Lloyd et al; Polym. Mater, Sci. Eng., 50, Apr. 1984, 152–155; Asymmetric Membrane Preparation from Solventless Casting Systems.
D. R. Lloyd et al; ASC polym. Mater, Sci. Eng., 51, 1984, 713–717; Use of the Three Component Solubility Parameter in Asymmetric Phase Inversion Membrane Preparation.
D. R. Lloyd et al; Journal of Membrane Science, 985, 22, 1–2; Phase Inversion Sulphonated Polysulphone Membranes.
D. R. Lloyd et al; Desalination, 1985, 56, 381–394; Poly(Ether Sulphone) Membranes for Desalination: Membrane Preparation and Characterization.

*Primary Examiner*—Paul R. Michl
*Assistant Examiner*—Peter Szekely
*Attorney, Agent, or Firm*—Cushman, Darby & Cushman

[57] ABSTRACT

A polymer solution contains a sulphonated polyarylethersulphone in a solvent mixture containing at least three components, where the solvent mixture has a delta-H in the range from 3 to 8.5; a delta-P in the range from 4 to 8 and a delta-D in the range 7.2 to 9.5 and each component of the solvent mixture is a liquid or low melting solid which is a non-solvent or poor solvent for the sulphonated polyarylethersulphone, and at least one of the components satisfies at least one of the conditions:
  a) said component has a delta-D of less than 8 when the value of delta-P is not more than 3; and
  b) said component has a delta-H of greater than 3 when the value of delta-P is at least 8.5; and
  c) said component has a delta-H of less than 8 when it contains at least one hydroxylic group; and
  d) said component is free of hydroxylic groups and has a delta-P which is greater than 3 and less than 8.5.

The solution can be used for the production of membranes suitable for use in reverse osmosis applications.

20 Claims, 1 Drawing Sheet

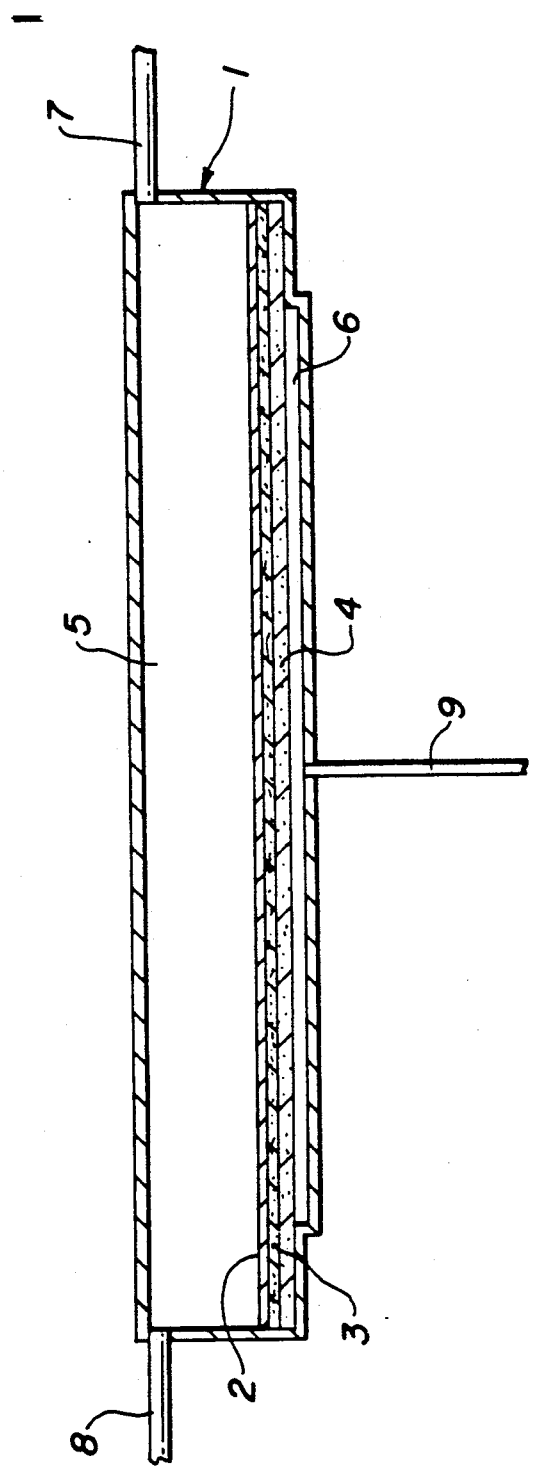

METHOD FOR THE PRODUCTION OF AN ASYMMETRIC SEMIPERMEABLE MEMBRANE FROM A SOLUTION OF A SULFONATED POLYARYLETHERSULFONE

This is a division of application Ser. No. 07/053,579, filed May 22, 1987, abandoned, which is a continuation of Ser. No. 865,832, filed May 22, 1986, abandoned.

This invention relates to polymer solutions and more particularly to the use of such solutions for the preparation of asymmetric semi-permeable membranes of sulphonated polyarylethersulphones.

Membranes which are useful in separation processes such as ultrafiltration and reverse osmosis may be prepared by casting solutions of polymeric materials. Asymmetric semi-permeable membranes, which can be used for reverse-osmosis, can be prepared by casting a solution of a film-forming ion-exchange material on a support and then coagulating the film using a non-solvent for the ion-exchange material. Asymmetric semi-permeable membranes are characterised by having a thin dense layer which functions as the active layer of the membrane and a thicker porous layer which functions as a reinforcing support for the active layer.

British Patent Specification No 1258851 discloses sulphonated polyarylethersulphones having a specified structure. These materials are disclosed as being ion exchange resins and as being suitable for the production of membranes for a number of applications including electrodialysis, fuel cell applications, osmosis and reverse osmosis. European Patent Specification No 8894 discloses alternative sulphonated polyarylethersulphones which may be prepared by a simple and readily controlled sulphonation technique and these materials also may be used to produce membranes for desalination and other processes.

For the preparation of a solution of a sulphonated polyarylether, for example a sulphonated polyarylethersulphone, various known solvents for the polymer have been proposed, especially aprotic polar solvents such as dimethylformamide and dimethylsulphoxide. Whilst such solvents can be used singly, it is desirable for the casting solution to contain a mixture of liquids and/or swelling agents and to include at least one material which is a non-solvent for the polymer, for example water, such non-solvent facilitating coagulation of the polymer film and formation of the aforementioned asymmetric structure.

In our non prior published European Patent Application Publication No 142973, we have disclosed solutions of sulphonated polyarylethersulphones in a solvent containing specified components. By the use of such solutions, asymmetric semi-permeable membranes can be produced which have a useful combination of flux and salt rejection properties. We have now found other solvent mixtures may be used to obtain polymer solutions which are suitable for the production of asymmetric semi-permeable membranes.

According to the present invention there is provided a solution of a sulphonated polyarylethersulphone in a solvent mixture wherein the solvent mixture has a delta-H in the range from 3 to 8.5 preferably 3 to 6; a delta-P in the range from 4 to 8 and a delta-D in the range from 7.2 to 9.5 preferably 7.2 to 9 and the solvent mixture contains at least three components, each of which is a liquid or a low melting solid which is a non-solvent or poor solvent for the sulphonated polyarylethersulphone wherein at least one component of the solvent mixture is a compound which has a delta-H, a delta-P and a delta-D having values such that at least one of conditions (a), (b), (c) and/or (d) is satisfied:

a) delta-D is less than 8 when delta-P is not more than 3;
b) delta-H is greater than 3 when delta-P is at least 8.5;
c) delta-H is less than 8 when the compound contains at least one hydroxylic group;
d) delta-P is greater than 3 and less than 8.5 and the compound is free of hydroxylic groups, and, at least in the presence of the sulphonated polyarylethersulphone, the solvent mixture forms a single liquid phase and none of the components of the solvent mixture reacts or complexes with another of the components of the solvent mixture or with the sulphonated polyarylethersulphone.

For convenience hereafter, the sulphonated polyarylethersulphone will be referred to as the "sulphonated polysulphone". Also for convenience hereafter, the at least one component of the solvent mixture whereof delta-H, delta-P and delta-D satisfies at least one of conditions (a), (b), (c) and/or (d) will be referred to as component I.

It will be appreciated that the solvent mixture may contain more than one compound which satisfies the requirements noted for component I. However, the solvent mixture may also include one or more compounds which do not satisfy any of conditions (a) (b) (c) and/or (d) Thus, in addition to at least one component I, the solvent mixture may contain at least one component which is a compound which, II) contains at least one hydroxylic group and has a delta-H with a value of at least 8; or
III) has a delta-D with a value of at least 8 and a delta-P with a value of not more than 3; or
IV) has a delta-P with a value of at least 8.5 and a delta-H with a value of not more than 3.

For convenience, these additional components of the solvent mixture will be referred to as components II, III and IV respectively. The solvent mixture in accordance with the present invention contains at least one component I and optionally one or more of each of components II, III and/or IV.

The components of the solvent mixture are liquids or low melting solids at ambient temperature. By "low melting solid" is meant a material which is solid at ambient temperature and has a melting point of not more than 50° C. The components of the solvent mixture preferably form a single liquid phase in the absence of the sulphonated polyarylethersulphone but some solvent mixtures form a single liquid phase only on the addition of the sulphonated polyarylethersulphone.

In referring both to the solvent mixture and the components thereof, reference is made to delta-H, delta-D and delta-P. Delta-H, delta-D and delta-P are components of the solubility parameter of the solvent mixture, and of each material which is a component of the solvent mixture, and are related by the expression $$(\text{delta-O})^2 = (\text{delta-H})^2 + (\text{delta-D})^2 + (\text{delta-P})^2$$

where delta-O is the solubility parameter and is given by the expression $$(\text{delta--O}) = (\Delta E_v/V)^{\frac{1}{2}}$$

where

ΔH − RT;

ΔH is the latent heat of vaporisation;

R is the gas constant;

T is the absolute temperature; and

V is the molar volume.

More specifically, delta-H is the hydrogen bonding component of the solubility parameter, delta-D is the dispersion component of the solubility parameter and delta-P is the polar component of the solubility parameter.

The concept of solubility parameters is discussed in many papers in the scientific literature including, inter alia, a paper by C. M. Hansen in Ind Eng Chem Prod Res Dev 8 March 1969, pages 2 to 11. Other papers in which solubility parameters are considered are, inter alia, Chemical Reviews, 75 (1975), pages 731 to 753, and Kirk-Othmer "Encyclopedia of Chemical Technology" Second Edition, Supplemental Volume (1971) pages 889 to 910.

A tabulation of values of delta-H, delta-D and delta-P is given in the Hansen paper and these may be used to determine suitable materials for use as component I, and optional components II, III and/or IV of the solvent mixture.

Materials for use as components I include materials which satisfy one or more of conditions (a), (b), (c) and/or (d). Ethyl acetate has a delta-D of 7.44, a delta-P of 2.6 and a delta-H of 4.5 and hence satisfies condition (a). Formamide has a delta-D of 8.4, a delta-P of 12.8 and a delta-H of 9.30 and hence satisfies condition (b). Acetic acid (delta-D is 7.1, delta-P is 3.9 and delta-H is 6.6), 2-ethoxyethanol (delta-D is 7.85, delta-P is 4.5 and delta-H is 7.0), and 2-butoxyethanol (delta-D is 7.76, delta-P is 3.1 and delta-H is 5.9) are all compounds containing a hydroxylic group and with a delta-H of less than 8 and hence all satisfy condition (c). 1-butanol has a delta D of 7.81, a delta-P of 2.8 and a delta-H of 7.7 and, since it contains a hydroxylic group, satisfies conditions (a) and (c). Compounds which do not contain a hydroxylic group and for which the value of delta-P is greater than 3 and less than 8.5 include acetic anhydride (delta-D is 7.5, delta-P is 5.4 and delta-H is 4.7), (delta-D is 7.58, delta-P is 5.1 and delta-H is 3.4), methyl ethyl ketone (delta-D is 7.77, delta-P is 4.4 and delta-H is 2.5) mesityl oxide (delta-D is 7.97, delta-P is 3.5 and delta-H is 3.0), and diethylene triamine (delta-D is 8.15, delta-P is 6.5 and delta-H is 7.0) and hence all satisfy condition (d). The solvent mixture may contain only compounds which are component I and mixtures of this type include, inter alia, acetone or methylethyl ketone with formamide and diethylene triamine; acetic acid, acetic anhydride, 2-ethoxyethanol or 2-butoxyethanol with methyl ethylketone and formamide; and 2-ethoxyethanol or 2-butoxyethanol with acetone and formamide.

Preferred materials for use as optional component II of the solvent mixture have a delta-H of at least 8, a delta-D of not more than 8 and a delta-P of at least 6. Especially preferred materials have a delta-H of greater than 10, a delta-D of less than 8 and a delta-P of at least 6. From the Hansen paper, few materials have a delta-H of the required value and even less satisfy the requirements for the preferred materials. Materials which may be used as optional component II include ethanol, 2-propanol and ethylene glycol and preferred materials such as diethylene glycol, water and ethanolamine.

Preferred materials for use as optional component III of the solvent mixture have a delta-D with a value of at least 8, a delta-P of not more than 3 and a delta-H of not more than 4. Materials satisfying the requirements include morpholine and preferred materials include, inter alia, 1,4-dioxane, anisole, carbon tetrachloride, chloroform and methylene chloride. Although furan and tetrahydrofuran have the preferred values of delta-D, delta-P and delta-H for use as component III, these materials are excluded due to their tendency to complex with the sulphonated polysulphone. Many hydrocarbons, particularly cyclic hydrocarbons, have the preferred values of delta-D, delta-P and delta-H but do not form a single phase mixture with many of the other materials used as components I, II and/or IV of the solvent mixture, even in the presence of the sulphonated polysulphone.

Preferred materials for use as optional component IV of the solvent mixture have a delta-P of at least 8.5, a delta-H of not more than 3 and a delta-D of at least 7.5. Materials satisfying the preferred requirements include, inter alia, propylene carbonate, ethylene carbonate, acetonitrile and nitromethane.

The solvent mixture contains at least one compound which is component I and may optionally include one or more compounds which are component II, component III and/or component IV. The components, and the proportions thereof, must be such that the solvent mixture obtained has values of delta-H, delta-P and dela-D which are in the ranges specified. It is preferred that the solvent mixture contains only three components. Solvent mixtures which contain at least one component I together with at least one of component II, component III and component IV include, inter alia, 1,4-dioxane, acetonitrile and formamide (components III, IV and I); 1,4-dioxane, methyl ethyl ketone, and formamide (components III, I and I); ethylene glycol, ethanol and acetone (components II, II and I) and 2-propanol, acetone and formamide (components II, I and I).

The sulphonated polysulphone which is dissolved in the solvent mixture is preferably one which has repeating units of the formula I.

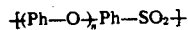  I wherein

Ph represents a phenylene residue, preferably a paraphenylene residue, wherein at least some of the groups Ph are sulphonated; and n is 1 or 2 and the value of n can differ along the polymer chain.

Whilst the sulphonated polysulphone may be one in which the value of n is only one or is only two, we prefer to use a copolymer in which the value of n is one for some repeat units and is two for other repeat units, polymers of this type being described, inter alia, in European Patent Specification No 8894.

The preferred polymers have repeat units of the formula:

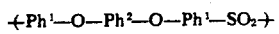  II together with the repeat units of the formula

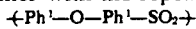  III wherein $Ph^1$ represents a phenylene residue, preferably a paraphenylene residue;

Ph² represents a phenylene residue, preferably a para-phenylene residue, having one or two groups —SO₃M;

M is a hydrogen atom, a metal atom and/or a group NR₄, wherein the groups M may be the same or different and the proportion of the groups M is sufficient to combine with the unsatisfied valencies of the group —SO₃; and R is a hydrogen atom or an alkyl group.

The sulphonated polysulphone may also include a proportion of unsulphonated copolymer having repeat units of the formula

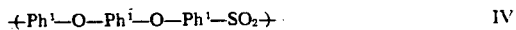    IV together with the repeat units of the formula II and formula III, wherein Ph¹ is as defined.

In the repeat units of the formula II, when Ph² is an ortho- or para- phenylene residue, there is typically only one group —SO₃M whereas when Ph² is a meta-phenylene residue there are typically two groups —SO₃M. When Ph² is an ortho-phenylene residue, the —SO₃M group is located in a position which is para- to one ether group and meta-to the other ether group, any further sulphonation occurring to locate the —SO₃M in positions meta- to each other. When Ph² is a para-phenylene residue, the —SO₃M group is located in a position ortho-to one ether group and meta-to the other ether group. When Ph² is a meta-phenylene residue, the —SO₃M groups are located in the position ortho-to one ether group and para-to the other ether group.

The sulphonated copolymers may be prepared by sulphonating a copolymer consisting of repeat units III and IV. The sulphonation is readily effected by dissolving the copolymer in concentrated sulphuric acid (98% w/w) at ambient temperature and agitating the mixture for a sufficient time for sulphonation of essentially all of the sub-units. —O—PH¹—O—in the repeat units of formula IV. The copolymers which are subjected to sulphonation suitably have from 1 to 99 mole % of units IV and correspondingly from 99 to 1 mole % of units III, and especially from 2.5 to 67 mole % of units IV and correspondingly from 97.5 to 33 mole % of units III. Sulphonation is desirably effected to convert at least 90% of the units IV to the units II. Sulphonation using concentrated sulphuric acid is described in European Patent Specification No 8894.

The sulphonated polysulphones are polymeric materials of high molecular weight such that the reduced viscosity (RV) of the polymer, (measured as a 1% by weight solution of the polymer in dimethylformamide at 25° C.) is at least 0.2 and preferably at least 0.4. The polymer may be such as to give an RV of up to 2.5, but it is generally preferred that the RV of the polymer does not exceed 2.0.

The copolymer which is to be sulphonated is conveniently prepared using a mixture of monomers to produce the desired repeat units III and IV and hence the units III and IV are distributed in a random fashion along the polymer chain. Hence, in the sulphonated copolymer, the units II (and IV) and III are also distributed in a random fashion along the polymer chain.

The sulphonated polysulphone contains the groups —SO₃M, where M may be hydrogen, a metal atom or a group NR₄. Sulphonated polysulphones in which M is a divalent metal atom, particularly an alkaline earth metal, are the subject of our non prior published European Patent Application Publication No 145305, which also discloses a method for the production of such divalent metal salts and the use thereof for the production of asymmetric semi-pemeable membranes.

As disclosed herein, the components of the solvent mixture, and the proportions thereof, are such that the solvent mixture has a delta-H, a delta-P and a delta-D having values in specified ranges. Preferred solvent mixtures are those in which delta-D has a value of at least 7.5. We have found that the preferred values of delta-H, delta-P and delta-D are dependent on the nature of the sulphonated polysulphone and when a divalent metal salt is being used, the preferred value of delta-H is in a more limited range, specifically from 4 to 5.5

Solvent mixtures which may be used in accordance with the present invention include the system hereinbefore described.

The components of the solvent mixture are non-solvents or poor solvents for the sulphonated polysulphone and the polymer is typically soluble in each of the components in an amount of not more than 5% by weight, preferably less than 1% by weight, especially less than 0.1% by weight.

The sulphonated polysulphone is preferably soluble in the solvent mixture in an amount of at least 10% by weight, more preferably at least 15% by weight, especially at least 20% by weight, for example 25 to 30% by weight. The quantity of polymer dissolved in the solvent mixture should be such that the resulting solution can be cast into a membrane and this will be dependent not only on the components of the solvent mixture but also on the sulphonated polysulphone, the molecular weight of the polymer and the degree of sulphonation of the polymer.

As is discussed in more detail hereafter, the solutions of the present invention can be used for the production of membranes.

The solvent mixtures consisting of 1,4-dioxane, acetonitrile and formamide; 1,4-dioxane, methyl ethyl ketone and formamide; and ethylene glycol, ethanol and acetone have been used to produce membranes from sulphonated polysulphones in which M is a hydrogen atom.

It is preferred that at least one component of the solvent mixture is volatile and at least partially evaporates under the conditions of casting the solution. Preferably, the remaining components of the solvent mixture are such, and are present in such proportions, that evaporation of some or all of the volatile component causes the sulphonated polysulphone to become insoluble in the residue of the solvent mixture.

As is discussed herein, a wide range of solvent mixtures can be used. For sulphonated polysulphones containing repeat units of formula II and formula III, and possibly also repeat units of formula IV, we have obtained a solvent mixture having satisfactory characteristics from a mixture consisting of acetonitrile, 1,4-dioxane and formamide which contains at least 20% by weight of acetonitrile, at least 35% by weight of 1,4-dioxane and not more than 30% by weight of formamide, the total amounts of three components aggregating to 100% by weight. We particularly prefer that the mixture contains 20 to 30% by weight of formamide, 20 to 40% by weight of acetonitrile and 35 to 55% by weight of 1,4-dioxane, the total amounts of the three components aggregating to 100% by weight. Other solvent mixtures consist of 1,4-dioxane, methyl ethyl ketone and formamide and contain at least 15% by weight of 1,4-dioxane, at least 30% by weight of methyl ethyl ketone and not more than 45% by weight of formamide, the total amounts of the three components aggregating to 100% by weight. Suitable mixtures contain 20 to 30% by weight of 1,4-dioxane, 40 to 50% by weight of methyl ethyl ketone and 25 to 40% by weight of formamide, the total amounts of the three components aggregating to 100% by weight. A further solvent mixture consists of ethylene glycol, ethanol and acetone and contains at least 10% by weight of ethylene glycol, at least 5% by weight of ethanol and not more than 85% by weight of acetone, the total amounts of the three components aggregating to 100% by weight. Suitable mixtures contain 15 to 25% by weight of ethylene glycol, 5 to 15% by weight of ethanol and 60 to 80% by weight of acetone, the total amounts of the three components aggregating to 100% by weight.

The most suitable mixtures for any particular sulphonated polysulphone depend not only on the basic polymer structure, that is the unsulphonated material, but also upon the sulphonation ratio of the polymer. By "sulphonation ratio" we mean the ratio of the number of sulphonated phenylene residues in the sulphonated polymer to the number of unsulphonated phenylene residues in the sulphonated polymer. The sulphonation ratio is preferably determined by $C^{13}$ n.m.r., but infrared techniques may also be used. However, we have found that titration (which gives a measure of the ion-exchange capacity of the polymer) generally indicates a lower degree of sulphonation than is found by n.m.r. or infra-red. Accordingly, although titration can be used, it is not the preferred technique for determining the sulphonation ratio. In general, polymers having lower sulphonation ratios require a solvent mixture in which the value of delta-H and delta-P for the solvent mixture is reduced. The most suitable mixtures for any given sulphonated polymer can be readily ascertained by trail.

The solution may be prepared by dissolving the sulphonated polysulphone in any suitable form, for example powder, chips, granules, in the mixed solvent to form a solution which preferably contains from 10% to 40% by weight of the sulphonated polysulphone.

Dissolution of the polymer and casting on the the support may be effected at ambient temperature but lower or higher temperatures may be used if desired, for example 0° C. to 100° C. However, it will be appreciated that the temperature should be below the boiling point of any of the components of the solvent mixture.

The solution of the sulphonated polysulphone in the solvent mixture may include a swelling agent. A wide range of materials may be used as the swelling agent and these are typically water soluble compounds, especially bifunctional carboxylic acids. Maleic acid is a suitable swelling agent. The amount of the swelling agent is dependent on the particular swelling agent, the sulphonated polysulphone and the solvent mixture but generally will be at least 1% by weight of the total composition (swelling agent, sulphonated polysulphone and solvent mixture) and will not usually exceed 10% by weight of the total composition.

The solution of the sulphonated polysulphone is formed into a membrane by casting on a support. Casting onto the support may be effected at essentially ambient temperature but lower or higher temperatures may be used if desired. The support may be, for example, a non-porous plane surface such as a glass or metal plate or, alternatively, may be a porous support such as a fabric and, where appropriate, it may have a shape other than a plane surface. Sufficient of the solution is cast on to the support in conventional manner to give a film of the desired thickness which may be adjusted as necessary by suitable mechanical means. It is preferred to produce a film having a thickness of at least 20 micrometers and not more than 300 micrometers, most preferably from 50 up to 250 micrometers, and especially from 75 to 200 micrometers. Alternatively, fine hollow fibres may be produced by extruding the solution through a die having a central mandrel, allowing some of the solvent to evaporate and then passing the fibres through a coagulation bath.

It is advantageous to allow at least partial evaporation of at least one component of the solvent mixture from the supported liquid film by exposing the latter to the atmosphere for a short time, for example 10 seconds to 5 minutes, before immersing the supported film in a coagulation bath. The coagulation bath may contain an aqueous solution, for example a solution of an inorganic salt such as sodium chloride or sodium nitrate, or may be a non-solvent liquid, or a liquid mixture, for example formed from one or more of the components of the solvent mixture. Preferably, the coagulation bath is an aqueous solution of a metal salt such as sodium chloride or sodium nitrate. To obtain a membrane of a higher flux, the coagulation bath may be a mixture of water and one or more of the components of the solvent mixture used in casting the membrane. The temperature of the coagulation bath is generally between $-20°$ C. and $60°$ C. and is preferably below $5°$ C. The coagulation treatment may be between 1 minute and and several hours, for example between 5 and 60 minutes.

After the coagulation treatment the membrane is recovered. In the case of a non-porous support, the membrane is detached from the support but, in the case of a porous support, the membrane remains adhered to the support. The recovered membrane may be subjected to heat treatment in order to relax the structure. Such a heat treatment preferably includes an immersion in an aqueous solution of an inorganic salt at an elevated temperature, typically from $70°$ C. to $150°$ C. This heat treatment may be effected with the membrane being held under pressure (4 to 100 $KN/m^2$) between porous supports, such as porous graphite, sintered stainless steel or filter paper on a non-porous support. Once prepared, and after any heat treatment, the membrane is preferably washed with distilled water to remove any residual solvent and/or, free ionic species and is then stored in distilled water until required.

Membranes obtained by the method of the invention may be used for the treatment of a wide variety of aqueous or non-aqueous solutions or suspensions by conventional reverse osmosis or ultrafiltration techniques. In particular they may be used for the purification of water, for example of brackish waters and industrial effluents. The membranes may also be used for gas separation.

To reduce the possibility of variations in membrane properties, it is desirable that all stages in the preparation of the casting solution, and the casting and coagulation steps, are effected under carefully controlled conditions of time, temperature and humidity. During the casting and subsequent evaporation, it is preferred that the humidity does not exceed about 65% relative humidity, for example in the range 35 to 50% relative humidity.

The accompanying drawing is a diagrammatic representation of a reverse osmosis cell in which the membranes of the present invention may be used.

The cell comprises a closed vessel 1 which is divided into two sections internally by a membrane 2. The membrane 2 is in contact with a sheet 3 of a porous material, for example filter paper, and sheet 3 is supported by a porous plate 4 which is not semi-permeable and which assists in preventing mechanical deformation of the membrane 2. The membrane 2, the sheet 3 and porous plate 4 are clamped at their edges to prevent leaking around the edges. The vessel 1 is divided by the membrane 2 into a large section 5 and a small section 6. The large section 5 is provided with two pipelines 7 and 8 for the supply and removal of liquid. The small section 6 is provided with a pipeline 9. In use, liquid under pressure, for example a dilute (about 0.2% by weight) aqueous solution of sodium chloride at a pressure of 4 MNm$^{-2}$, is passed into section 5 of the vessel 1 through pipeline 7 and is withdrawn through pipeline 8. The pressure is sufficient to cause reverse osmosis and some water passes through the membrane 2 into the section 6 from which it is withdrawn through the pipeline 9. The apparatus can be operated at ambient temperature (about 25° C.) but higher temperatures may be used. In a continuous process, a further pipeline may be connected to section 6 of the vessel 1 whereby a continuous flow of a carrier liquid, which is the liquid being collected, is passed through section 6. Other modifications and variations may be effected in the manner known to those skilled in the art.

Various aspects of the present invention are illustrated, but not limited, by the following Examples, in which all parts and percentages are by weight unless otherwise indicated.

EXAMPLES 1 TO 3

A sulphonated polyarylethersulphone copolymer containing about 20 mole % of units II about 80 mole % of units III in which Ph$^1$ and Ph$^2$ are para-phenylene residues and M is a hydrogen atom, having a sulphonation ratio of 1:10, and a reduced viscosity (as defined herein) of 0.82 was dissolved, at a temperature of 25° C., in solvent mixtures to give a 26% by weight solution of the copolymer in the solvent mixture. Details of the solvent mixtures used are given in Table One.

TABLE ONE

| Example | Solvent Mixture | | Delta Value (a) |
|---|---|---|---|
| | Component | % by weight | |
| 1 | 1,4 - dioxane | 45 | D 8.44 |
| | Acetonitrile | 31 | P 6.3 |
| | Formamide | 24 | H 4.6 |
| 2 | 1,4 - dioxane | 24 | D 8.27 |
| | Methyl ethyl ketone | 45 | P 5.8 |
| | Formamide | 31 | H 4.5 |
| 3 | Ethylene glycol | 19.4 | D 7.69 |
| | Ethanol | 9.3 | P 5.1 |
| | Acetone | 71.3 | H 5.4 |

Notes to Table One
(a) Delta values for the solvent mixture. D is delta-D value. P is delta-P value, and H is delta-H value.

The solution was filtered through a gauze with a mesh size of 30 micrometers and then centrifuged at 2000 rpm for 20 to 30 minutes.

The solution was cast on to a glass plate and a film of the desired thickness was formed on the plate with the aid of a brass spreader. After a minute evaporation in air, coagulation of the film was effected by immersion for 30 minutes in distilled water at about 0° C. The glass plate and the membrane formed on it were removed from the water and the membrane was removed from the glass plate. The membrane was washed with distilled water and then was stored in distilled water until tested.

The recovered membrane was tested using an apparatus of the type hereinbefore described and in which the membrane was placed in contact with a porous support and the exposed side, being the side exposed to the air during casting, was subjected to continuous feed of an aqueous solution of sodium chloride (0.2% by weight) pumped across the surface of the membrane at a gauge pressure of 600 p.s.i. (4.14 MNm$^{-2}$) and a temperature of 25° C. The liquid passing through the membrane was analysed. The results of three such experiments are given in Table Two.

TABLE TWO

| Example (b) | Film Thickness (mm) | Flux (m · day$^{-1}$) (c) | S R (%) (d) |
|---|---|---|---|
| 1 | 0.15 | 2.15 | 47.8 |
| 2 | 0.15 | 1.84 | 59.4 |
| 3 | 0.15 | 0.23 | 80.0 |

Notes to Table Two
(b) The numbers of the Examples refer to the solvent mixtures as detailed in Table One.
(c) Flux is the volume (in m$^3$) of the solution which passes through the membrane (an area of one m$^2$) in one day and is expressed as m · day$^{-1}$.
(d) S R is % salt rejection and is determined by measuring the conductivity of the solution fed to the membrane cell and measuring the conductivity of the solution permeating the membrane, and is given by the relationship $$\% \text{ salt rejection} = \left(1 - \frac{\text{conductivity of permeate}}{\text{conductivity of feed}}\right) \cdot 100$$

We claim:

1. A method for the production of an asymmetric semipermeable membrane which method comprises forming a solution of a sulphonated polyarylethersulphone in a solvent mixture, casting the solution on a support to form a film on the support, immersing, in a coagulation bath, the cast film of the solution on the support and recovering a membrane from the coagulation bath, wherein the sulphonated polyarylethersulphone has repeating units of the formula (I):

$$\{(Ph-O)_n PH-SO_2\} \tag{I}$$

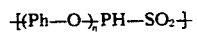

wherein
Ph represents a phenylene residue wherein at least some of the groups Ph are sulphonated; and
n is 1 or 2 and the value of n can differ along the polymer chain; and
wherein the solvent mixture has a delta-H in the range from 3 to 8.5; a delta-P in the range from 4 to 8 and a delta-D in the range from 7.2 to 9.5 and the solvent mixture contains at least three components, each of which component has a melting point of not more than 50° C. and which is a non-solvent or poor solvent for the sulphonated polyarylethersulphone, wherein at least one component (I) of the solvent mixture is a compound which has a delta-H, a delta-P and a delta-D having values such that at least one of conditions (a), (b), (c) and (d) is satisfied:
(a) delta-D is less than 8 when delta-P is not more than 3,
(b) delta-H is greater than 3 when delta-P is at least 8.5;
(c) delta-H is less than 8 when the compound contains at least one hydroxylic group;

(d) delta-P is greater than 3 and less than 8.5 and the compound is free of hydroxylic groups; and at least in the presence of the sulphonated polyarylethersulphone, the solvent mixture forms a single liquid phase and none of the components of the solvent mixture reacts or complexes with another of the components of the solvent mixture or with the sulphonated polyarylethersulphone.

2. A process for the purification of brackish waters or aqueous industrial effluents by effecting reverse osmosis or ultrafiltration using an asymmetric semipermeable membrane obtained by the process of claim 1.

3. A method according to claim 1, wherein the solvent mixture has a delta-H in the range from 3 to 6; a delta-P in the range from 4 to 8 and a delta-D in the range from 7.2 to 9.

4. A method according to claim 1, wherein the coagulant of the coagulation bath comprises water.

5. A method according to claim 4, wherein the coagulant comprises an aqueous solution of an inorganic salt.

6. A method according to claim 5, wherein the inorganic salt is sodium chloride or sodium nitrate.

7. A method according to claim 1, wherein the temperature of the coagulation bath is in the range −20° C. to 60° C.

8. A method according to claim 1, wherein the temperature of the coagulation bath is below 5° C.

9. A method according to claim 1, wherein the membrane is subjected to a heat treatment by immersion in an aqueous solution of an inorganic salt at an elevated temperature.

10. A method according to claim 1, wherein in addition to said component (I) at least one component of the solvent mixture is a compound which either:
   (II) contains at least one hydroxylic group and has a delta-H with a value of at least 8; or
   (III) has a delta-D with a value of at least 8 and a delta-P with a value of not more than 3; or
   (IV) has a delta-P with a value of at least 8.5 and a delta-H with a value of not more than 3.

11. A method according to claim 1, wherein the compound which is component (I) is selected from ethyl acetate, formamide, acetic acid, 2-ethoxyethanol, 2-butoxyethanol, 1-butanol, acetic anhydride, acetone, methyl ethyl ketone, mesityl oxide and diethylene triamine.

12. A method according to claim 1, wherein in addition to said component (I) the solvent mixture contains at least one compound which is component (II) and which is selected from ethanol, 2-propanol, ethylene glycol, diethylene glycol, water and ethanolamine.

13. A method according to claim 1, wherein in addition to said component (I) the solvent mixture contains at least one compound which is component (III) and which is selected from morpholine, 1,4-dioxane, anisole, carbon tetrachloride, chloroform and methylene chloride.

14. A method according to claim 1, wherein in addition to said component (I) the solvent mixture contains at least one compound which is component (IV) and which is selected from propylene carbonate, ethylene carbonate, acetonitrile and nitromethane.

15. A method according to claim 1, wherein the solvent mixture consists of 1,4-dioxane, acetonitrile and formamide; or 1,4-dioxane, methyl ethyl ketone and formamide; or ethylene glycol, ethanol and acetone.

16. A method according to claim 1, wherein at least one component of the solvent mixture is volatile and at least partially evaporates when casting a film from the solution.

17. A method according to claim 1, wherein the sulphonated polyarylethersulphone is a material having repeat units of the formula (II):

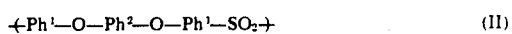

together with repeat units of the formula (III):

wherein
Ph$^1$ represents a phenylene residue;
Ph$^2$ represents a phenylene residue having one or two groups —SO$_3$M;
M is a hydrogen atom, a metal atom or a group NR$_4$, wherein the groups M may be the same or different and the proportion of the groups M is sufficient to combine with the unsatisfied valencies of the group —SO$_3$; and
R is a hydrogen atom or an alkyl group.

18. A method according to claim 17, wherein the sulphonated polyarylethersulphone contains also repeat units of formula (IV):

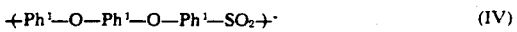

wherein Ph$^1$ represents a phenylene residue.

19. A method according to claim 17, wherein the sulphonated polyarylethersulphone is present in said solution in an amount of 10% to 40% by weight.

20. An asymmetric semi-permeable membrane obtained by the method of claim 1.

* * * * *